(12) United States Patent
Watada et al.

(10) Patent No.: US 8,177,038 B2
(45) Date of Patent: May 15, 2012

(54) DISK BRAKE APPARATUS

(75) Inventors: Akifumi Watada, Ueda (JP); Takenori Tsuchiya, Ueda (JP); Kazuo Koyama, Ueda (JP); Yoshihisa Uchida, Wako (JP); Akihiko Koike, Wako (JP); Akihito Kon, Wako (JP)

(73) Assignees: Nissin Kogyo Co., Ltd., Ueda-shi (JP); Honda Motor Co., Ltd., Tokyo (JP)

( * ) Notice: Subject to any disclaimer, the term of this patent is extended or adjusted under 35 U.S.C. 154(b) by 964 days.

(21) Appl. No.: 12/175,941

(22) Filed: Jul. 18, 2008

(65) Prior Publication Data

US 2009/0020378 A1    Jan. 22, 2009

(30) Foreign Application Priority Data

Jul. 20, 2007 (JP) ................ 2007-189307
Jul. 20, 2007 (JP) ................ 2007-189308

(51) Int. Cl.
*F16D 65/16* (2006.01)
*F16D 65/56* (2006.01)
(52) U.S. Cl. .............. 188/72.8; 188/72.7; 188/71.8
(58) Field of Classification Search ........... 188/71.1, 188/72.1, 71.7–71.9, 72.7, 72.8, 72.9, 196 D, 188/196 V
See application file for complete search history.

(56) References Cited

U.S. PATENT DOCUMENTS 5,060,765 A * 10/1991 Meyer ................ 188/71.9
2009/0014257 A1 * 1/2009 Watada ................ 188/17

FOREIGN PATENT DOCUMENTS

| DE | 3914613 A1 * | 11/1990 |
| JP | 2739879 B2 | 4/1998 |
| JP | 2000-136838 A | 5/2000 |

* cited by examiner

*Primary Examiner* — Robert A Siconolfi
*Assistant Examiner* — Anna Momper
(74) *Attorney, Agent, or Firm* — Westerman, Hattori, Daniels & Adrian, LLP (57) ABSTRACT

A thrust transmitting plate 14b on a cylinder hole bottom side portion of an adjuster nut 14, a drive side cam plate 12, and a cam spring 15 for biasing the thrust transmitting plate 14b toward the drive side cam plate 12 are accommodated in a generally cylindrical housing 16. Parts of the arc face of the circumferential wall of the housing 16 are deformed inwardly to form flat portions 16d. Engaging apertures 16e are formed in the flat portions 16d such that the engaging protrusions 14d are movable only in the cylinder axis direction when they are engaged. Portions of the circumferential wall of the housing 16 are protruded outwardly in convex shapes by presswork to form plural locking parts 16g arranged in the circumferential direction. The housing 16 is configured so as to be mounted in a cylinder hole 8 by latching those locking parts 16g to a circumferential groove 8f formed in the cylinder hole 8.

6 Claims, 5 Drawing Sheets

DISK BRAKE APPARATUS

BACKGROUND OF THE INVENTION

1. Technical Field

The present invention relates to a disk brake apparatus, particularly to a disk brake apparatus comprising a piston for hydraulically pressing friction pads, an adjuster for automatically adjusting the gap between the pads and a disk rotor, and a parking brake for pushing the piston through the adjuster by a ball ramp type thrust conversion mechanism.

2. Background Art

A disk brake apparatus with a parking brake, comprising a hydraulic actuating mechanism operated by a brake pedal, and a mechanical actuating mechanism configured to be pulled by a hand lever or a foot pedal is known as one of disk brake apparatuses for use in a four-wheel vehicle or the like. In general, a piston that constitutes a part of the hydraulic actuating mechanism is placed on the distal end opening side of a cylinder hole provided in the caliper body, and an adjuster having an adjuster nut and an adjuster bolt is placed on the back side of the piston in such a disk brake apparatus with a parking brake. Furthermore, a thrust conversion mechanism that constitutes a part of the mechanical actuating mechanism is placed on the bottom side of the cylinder hole.

Conventionally, a ball ramp type thrust conversion mechanism has been widely used as the thrust conversion mechanism. In the ball ramp type thrust conversion mechanism, a fixed side cam plate and a drive side cam plate, both of which have their respective ramp grooves formed therein for accommodating cam bearings, are placed opposite to each other. By turning the drive side cam plate through the parking brake operation, a thrust for moving the piston to the disk rotor side is generated by the cam action of the ramp grooves and the cam bearings. Then, the thrust pushes the piston to the disk rotor side through the adjuster and presses the friction pads to the disk rotor so that the braking force is generated.

Furthermore, in some cases, the thrust conversion mechanism, the adjuster having a thrust transmitting plate, and a cam spring for pushing the thrust transmitting plate toward the thrust conversion mechanism are accommodated in a generally cylinder-shaped housing, and engaging protrusions formed on the outer circumference of the thrust transmitting plate engage in the engaging apertures formed on the circumferential wall of the housing in an attempt to prevent the rotation of the thrust transmitting plate (see Japanese Patent No. 2739879 and Japanese Unexamined Patent Publication No. 2000-136838). Furthermore, in some cases, portions of the circumferential wall of the housing are partially cut and bent outwardly to form plural locking parts, and a C-shaped ring is attached to the cylinder hole opening sides of the locking parts. Then, the housing is mounted to the housing mounting portion of the cylinder hole through the C-shaped ring (see Japanese Patent No. 2739879).

SUMMARY OF THE INVENTION

However, since the engaging apertures are formed on the circumferential wall of the cylindrical housing in the above-described disk brake apparatus, it has been difficult to secure enough overlap widths for fitting the engaging apertures and the engaging protrusions. Furthermore, if the plate thickness of the housing is increased in order to secure sufficient overlap widths for fitting the engaging apertures and the engaging protrusions, designing and manufacturing the adjust mechanism, the cylinder hole, and the like become difficult. Moreover, in the case where the locking parts are formed in the housing by cutting and bending the circumferential wall of the housing in the above-described disk brake apparatus, it is difficult to achieve a sufficient strength. If the plate thickness of the housing is increased to enhance the strength of the locking parts, it not only increases the weight of the apparatus, but also makes designing and manufacturing the adjust mechanism, the cylinder hole, and the like more difficult.

A first object of the present invention is to provide a disk brake apparatus capable of achieving the reliable prevention of the rotation of the thrust transmitting plate with a simple structure. A second object of the present invention is to provide a disk brake apparatus capable of increasing the strength of the locking parts formed on the housing and firmly mounting the housing to the cylinder hole with a simple structure.

To achieve the above-mentioned objects, a disk brake apparatus in accordance with one aspect of the present invention includes a piston accommodated in the distal end opening side of a cylinder hole, a thrust conversion mechanism arranged on the bottom side of the cylinder hole, and an adjuster having an adjuster nut and an adjuster bolt, the adjuster being provided between the thrust conversion mechanism and the piston. The piston is pushed by the thrust conversion mechanism through the adjuster. The thrust conversion mechanism comprises a fixed side cam plate attached on the bottom wall of the cylinder hole, a camshaft passing through the cylinder hole bottom wall and the fixed side cam plate, the camshaft being rotatable with respect to the cylinder hole bottom wall and the fixed side cam plate and movable in the cylinder axis direction, a drive side cam plate provided at the cylinder hole opening side end portion of the camshaft, and ramp grooves formed in the drive side cam plate and the fixed side cam plate, each of the ramp grooves in the drive side cam plate and a corresponding one of the ramp grooves in the fixed side cam plate being arranged in positions facing each other, and cam bearings accommodated in those ramp grooves. The adjuster comprises a thrust transmitting plate at the cylinder hole bottom side end portion, which faces the drive side cam plate of either one of the adjuster nut and the adjuster bolt. The thrust transmitting plate, the drive side cam plate, and a cam spring for biasing the thrust transmitting plate toward the drive side cam plate are accommodated in a generally cylindrical housing, which is mounted in the cylinder hole. Engaging protrusions are formed on the outer circumference of the thrust transmitting plate. Portions of the arc face of the circumferential wall of the housing are deformed inwardly to form flat portions, and engaging apertures are formed on the flat portions. The engaging apertures are configured such that the engaging protrusions are movable only in the cylinder axis direction when the engaging apertures and the engaging protrusions are engaged. Furthermore, in the disk brake apparatus having the above-mentioned structure, portions of the circumferential wall of the housing are protruded outwardly in convex shapes by presswork to form plural locking parts arranged in the circumferential direction. The housing is configured so as to be mounted in the cylinder hole by latching those locking parts to the housing mounting portion formed in the cylinder hole.

In a disk brake apparatus in accordance with one aspect of the present invention, engaging protrusions formed on the outer circumference of the thrust transmitting plate engage in engaging apertures provided in the flat portions formed on the circumferential wall of the housing. Therefore, sufficient overlap widths for fitting the engaging apertures and the engaging protrusions can be secured without the need to significantly protrude the engaging protrusions from the circumferential wall, and the reliable prevention of the rotation of the thrust transmitting plate can be achieved with a simple structure.

In addition, since the locking parts are formed by protruding portions of the housing outwardly into convex shapes by presswork in the disk brake apparatus in accordance with one aspect of the present invention, sufficient sizes of the locking parts both in the housing axis direction and the circumferential direction, and sufficient sizes of the protrusions in the radially outward direction can be secured. Therefore, the strength can be improved, and the housing can be firmly mounted in the cylinder hole. Since the locking parts may be formed in the same presswork process as the presswork for the housing itself, they can be easily formed.

DESCRIPTION OF THE PREFERRED EMBODIMENT

Figure 1:
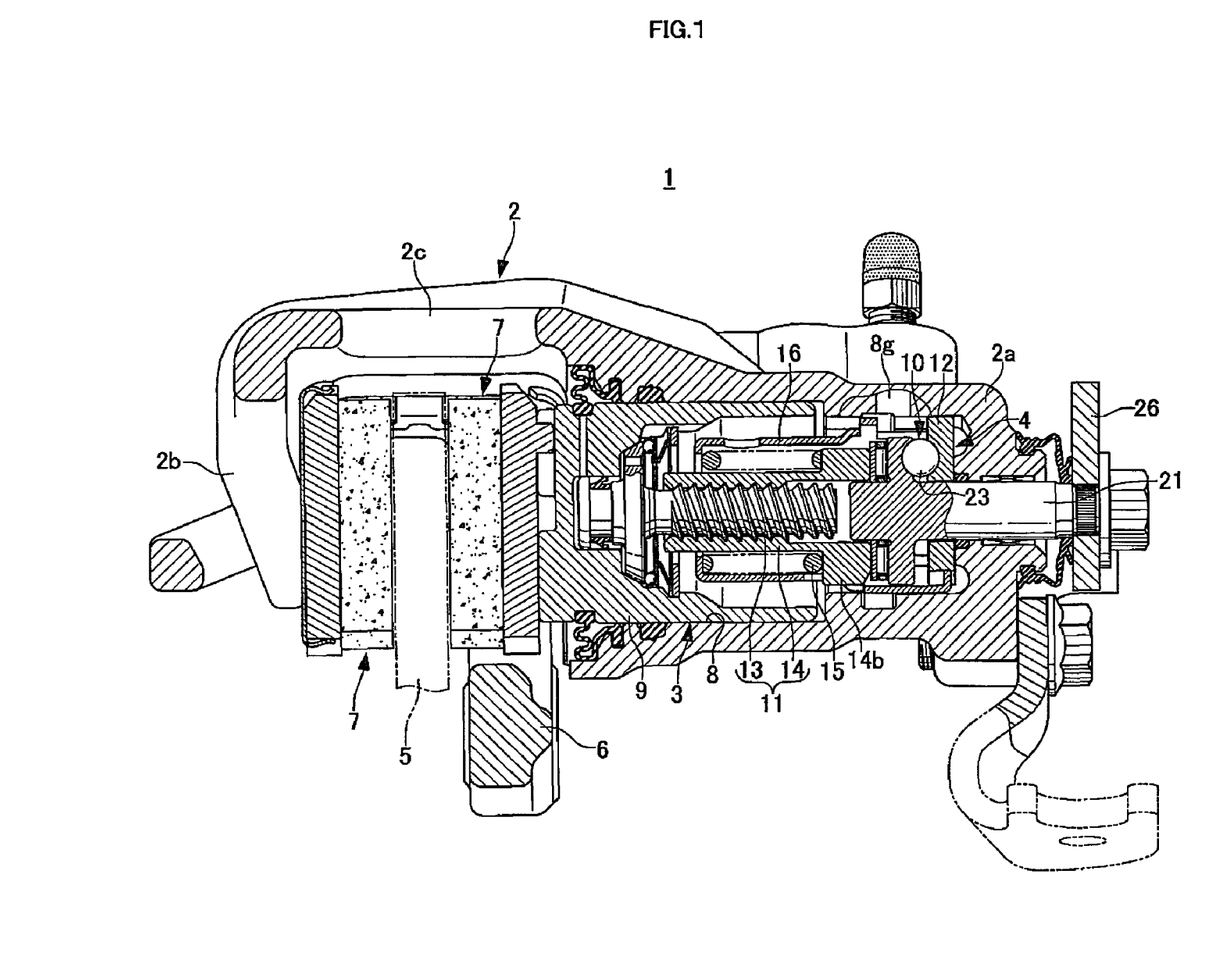
FIG. 1 is a cross-sectional front view of a disk brake apparatus in accordance with one embodiment of the present invention.
Figure 2:
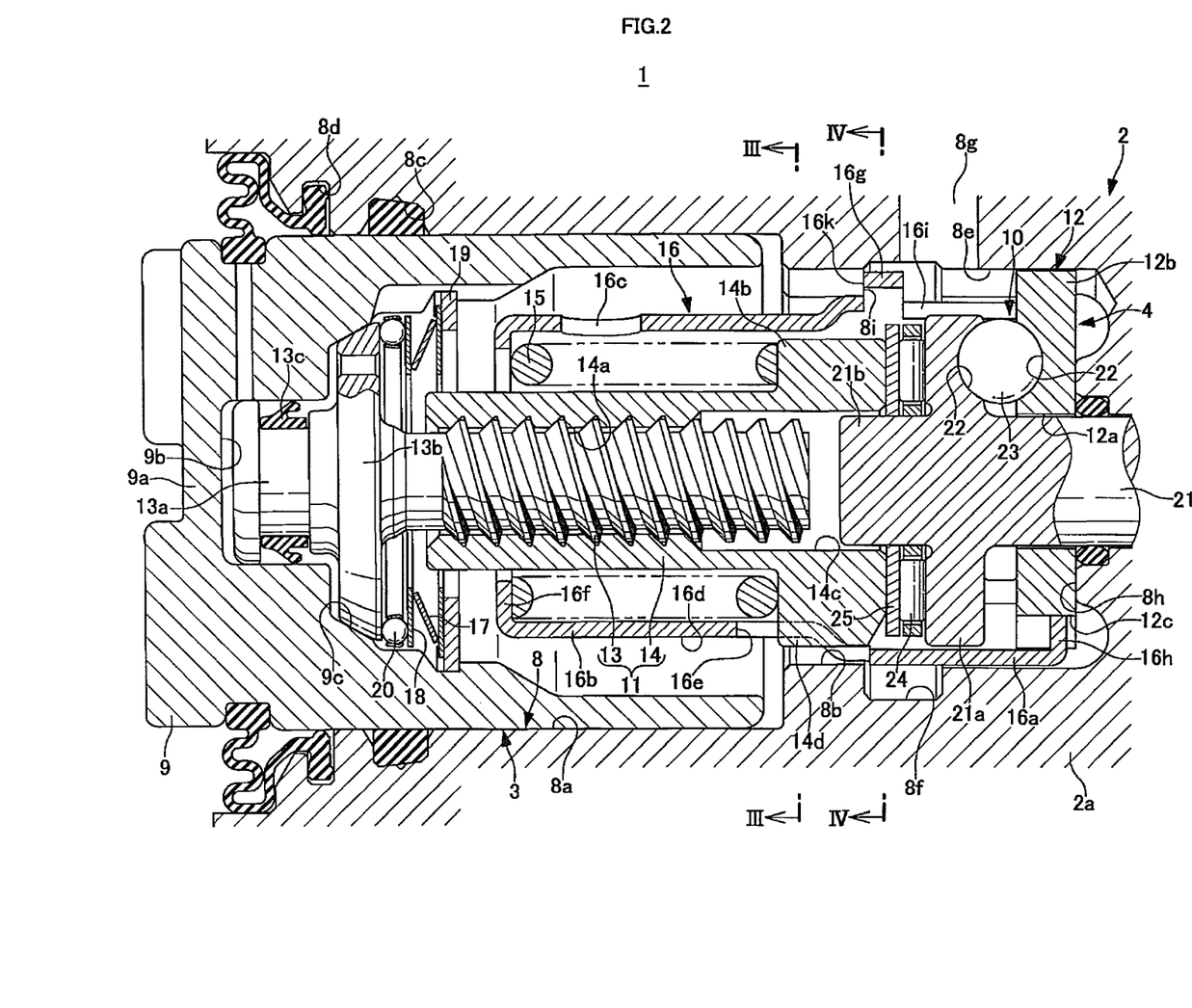
FIG. 2 is an enlarged cross-section of the main part in FIG. 1.
Figure 3:
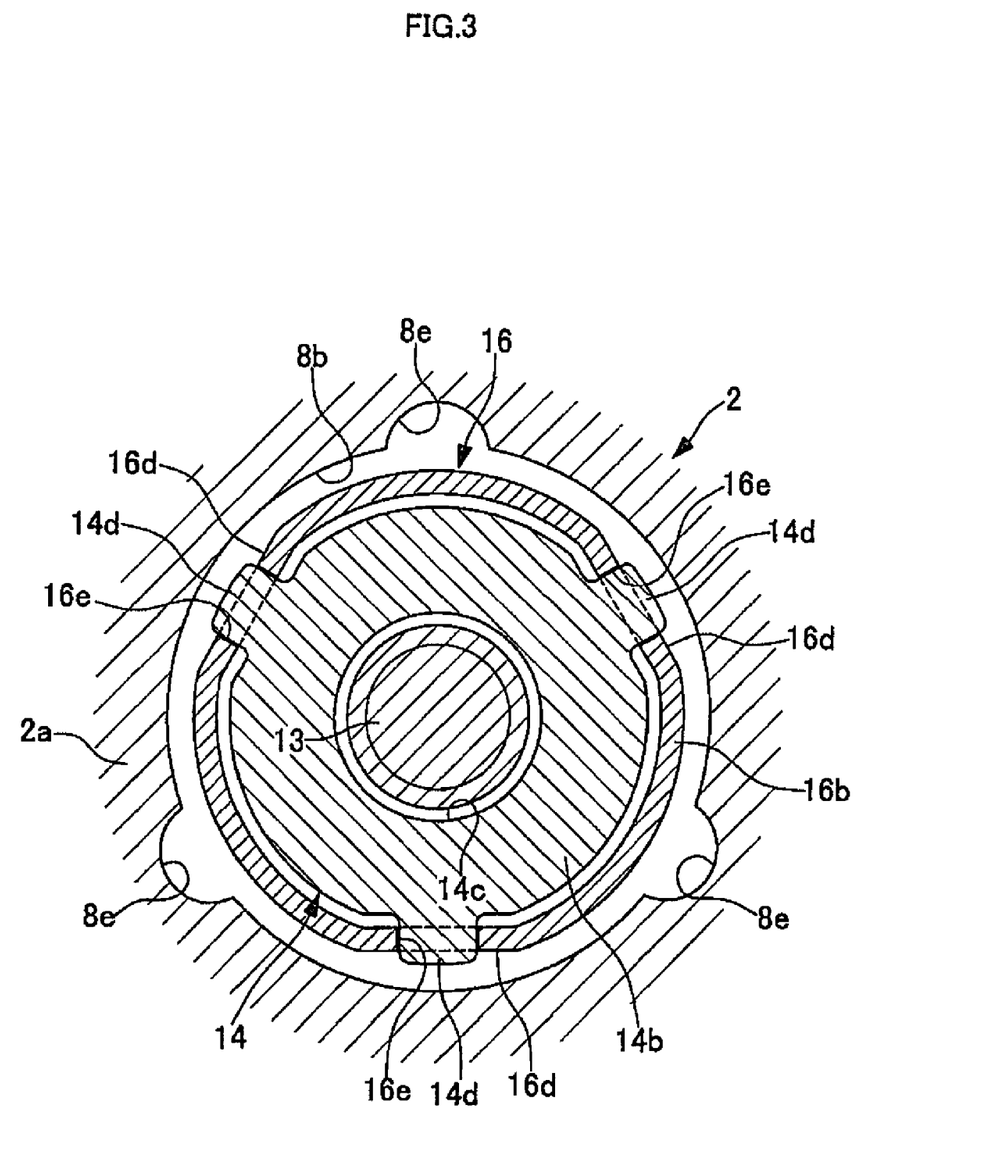
FIG. 3 is a cross-section taken along the line III-III in FIG. 2.
Figure 4:
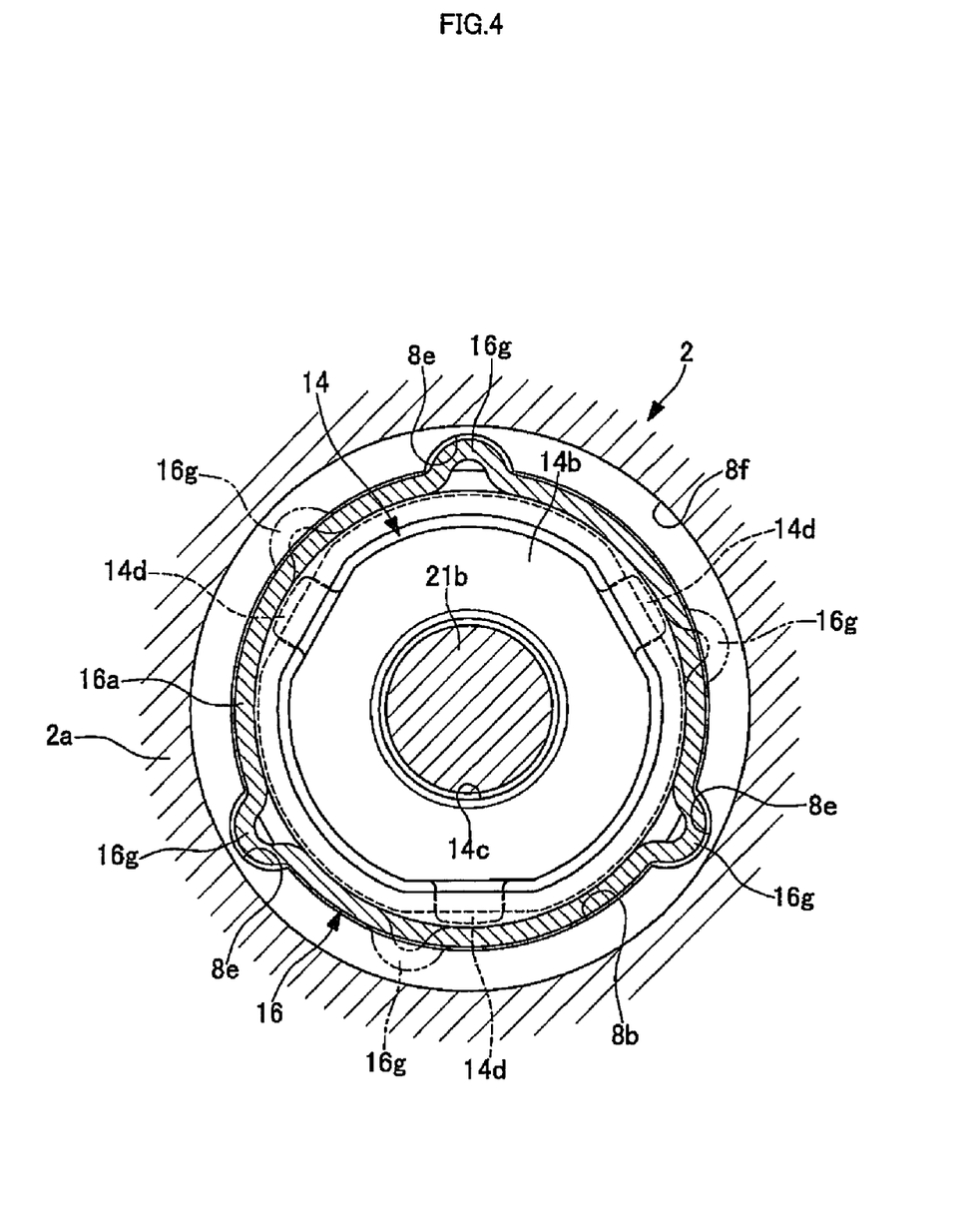
FIG. 4 is a cross-section taken along the line IV-IV in FIG. 2.
Figure 5:
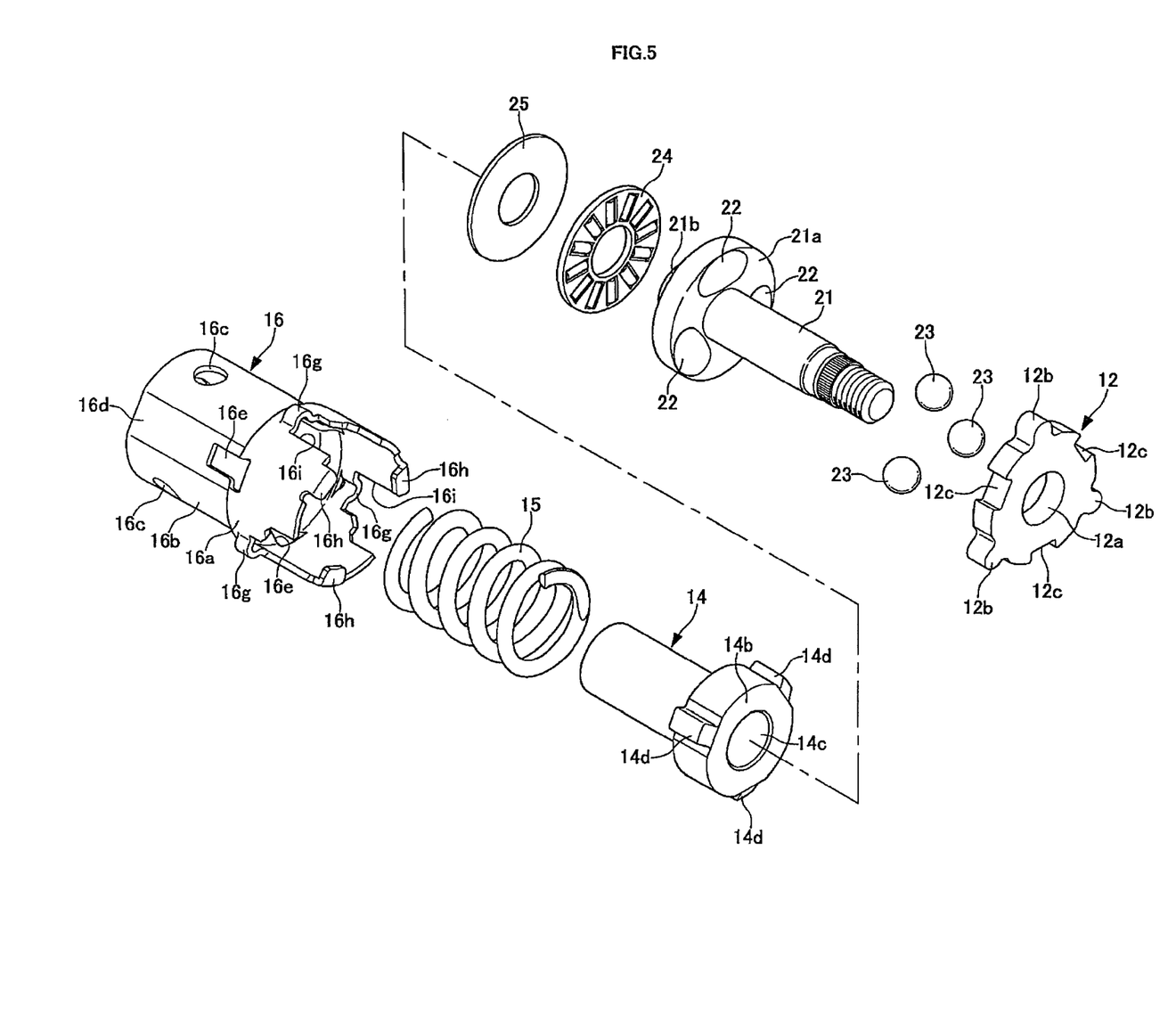
FIG. 5 is an exploded perspective view of a thrust conversion mechanism, an adjust nut, and a housing of the disk brake apparatus shown in FIG. 1.

An embodiment of the present invention is explained in detail with reference to the drawings. FIG. 1 is a cross-sectional front view of a disk brake apparatus in accordance with one embodiment of the present invention, FIG. 2 is an enlarged cross-section of the main part in FIG. 1, FIG. 3 is a cross-section taken along the line III-III in FIG. 2, FIG. 4 is a cross-section taken along the line IV-IV in FIG. 2, and FIG. 5 is an exploded perspective view of a thrust conversion mechanism, an adjust nut, and a housing of the disk brake apparatus shown in FIG. 1.

A disk brake apparatus 1 in accordance with the present embodiment has a parking brake, in which both a hydraulic actuating mechanism 3 operated by a brake pedal (not shown) and a mechanical actuating mechanism 4 operated by a hand lever or a foot pedal (not shown), for the parking brake are provided in a caliper body 2. The caliper body 2 is supported through a pair of slide pins (not shown) by a caliper bracket 6 which is fixed to the vehicle body at one side of a disk rotor 5 such that the caliper body 2 is movable in the disk axis direction.

The caliper body 2 has an action portion 2a and a reaction portion 2b, both of which are placed opposite to each other on the both sides of the disk rotor 5, and a bridge portion 2c for connecting these two portions across the disk rotor 5. A pair of friction pads 7, 7 is placed opposite to each other sandwiching the disk rotor 5 between the action portion 2a and reaction portion 2b.

A cylinder hole 8, which is open on the disk rotor side, is formed in the action portion 2a. A large diameter portion 8a and a small diameter portion 8b are formed on the distal end opening side and the cylinder hole bottom side of the cylinder hole 8 respectively. A sealing groove 8c and a boot groove 8d are circumferentially formed on the opening side of the large diameter portion 8a. Three engaging grooves 8e extending in the cylinder axis direction are arranged at regular intervals in the circumferential direction on the small diameter portion 8b, and a circumferential groove 8f which connects the middle portions of these three engaging grooves 8e is also formed on the small diameter portion 8b. The circumferential groove 8f corresponds to the housing mounting portion of the present invention. A bleeder hole 8g which communicates with one of the engaging grooves 8e and the circumferential groove 8f pierces through the upper side of the action portion 2a. The bleeder hole 8g is located in the upper part of the vehicle body when the caliper body 2 is mounted to the vehicle body.

The large diameter portion 8a accommodates a cylindrical piston 9 having a closed bottom. The cylindrical piston 9 constitutes a part of the hydraulic actuating mechanism 3. The small diameter portion 8b accommodates a thrust conversion mechanism 10, which constitutes a part of the mechanical actuating mechanism 4. An adjuster 1 for automatically adjusting the brake gap between the disk rotor 5 and the friction pads 7 is arranged between the piston 9 and the thrust conversion mechanism 10. Furthermore, a fixed side cam plate 12 is arranged in the cylinder hole bottom wall 8h.

The adjuster 1 has an adjuster bolt 13, and an adjuster nut 14. A small diameter piston 13a and a clutch plate 13b are provided on the head of the adjuster bolt 13. The adjuster nut 14 has a multiple thread screw portion 14a formed on the inner surface for threadably engaging with the adjuster bolt 13, and a thrust transmitting plate 14b is provided at the end portion on the cylinder hole bottom side. A cylindrical housing 16 is arranged over the outer circumference of the adjuster nut 14 for accommodating a cam spring 15 and the thrust transmitting plate 14b.

The piston 9 is accommodated in the large diameter portion 8a of the cylinder hole 8 such that the bottom wall 9a faces the disk rotor side, and the adjuster nut 14 and the adjuster bolt 13 are located on the internal center axis of the piston 9. A fitting hole 9b is provided on the inner surface of the bottom wall of the piston 9, and the small diameter piston 13a is fitted into the fitting hole 9b through a sealing material 13c. The clutch plate 13b is pressed on a conical surface 9c extending radially from the opening portion of the fitting hole 9b by the action of a spring member 17.

The spring member 17, one end of which contacts a bearing plate 18 and the other end of which contacts a retaining ring 19 provided on the outer circumference portion of the adjuster nut 14, rotatably biases the adjuster bolt 13 toward the bottom wall 9a through the bearing plate 18 and ball bearings 20.

The thrust conversion mechanism 10 comprises a camshaft 21, which passes through the cylinder hole bottom wall 8h and the fixed side cam plate 12 and is rotatable with respect to the cylinder hole bottom wall 8h and the fixed side cam plate 12 and movable in the cylinder axis direction, a drive side cam plate 21a provided at the cylinder hole opening side end portion of the camshaft 21, and three ramp grooves 22 formed in the drive side cam plate 21a and three ramp grooves 22 formed in the fixed side cam plate 12 and three cam bearings 23 accommodated in those ramp grooves 22. Each of the ramp grooves 22 in the drive side cam plate 21a and a corresponding one of the ramp grooves 22 in the fixed side cam plate 12 is arranged at positions facing each other.

The drive side cam plate 21a has a cylindrical portion 21b protruding from the center of the cylinder hole opening side end portion, and the thrust transmitting plate 14b contacts the cylinder hole opening side surface through a thrust bearing 24 and a spacer 25.

The thrust transmitting plate 14b has an accommodation hole 14c formed at the center of the cylinder hole bottom side end portion for accommodating the cylindrical portion 21b and the screw portion distal end of the adjuster bolt 13. Three engaging protrusions 14d are arranged at regular intervals in the circumferential direction on the outer circumference of the thrust transmitting plate 14b. The engaging protrusions 14d are formed in such sizes that they can be accommodated inside the large diameter tubular portion 16a of the housing 16 (which is explained later) and protrude outwardly from the small diameter tubular portion 16b of the housing 16 when the adjuster nut 14 is mounted in the housing 16.

The fixed side cam plate 12 is formed in a disk shape, and an insertion through hole 12a, through which the camshaft 21 passes, is formed at the center of the disk. Three engaging ribs 12b, each of which engages with a respective one of the engaging grooves 8e of the cylinder hole 8, protrude from the outer circumference of the fixed side cam plate 12 at regular intervals in the circumferential direction. Locking grooves 12c of the housing 16 are formed at regular intervals in the circumferential direction such that each of them is placed between two neighboring engaging ribs 12b, 12b.

The housing 16 integrally comprises a large diameter tubular portion 16a formed with an outer diameter slightly smaller than the inner diameter of the small diameter portion 8b of the cylinder hole 8 and small diameter tubular portion 16b having an inner diameter slightly larger than the outer diameter of the thrust transmitting plate 14b formed in the adjuster nut 14. Three through holes 16c, which pierce through the circumferential wall of the housing 16, are arranged at regular intervals in the circumferential direction on the circumferential wall of the small diameter tubular portion 16b. Three flat portions 16d extending in the cylinder axis direction are also arranged at regular intervals on the circumferential wall of the small diameter tubular portion 16b. Each of the flat portions 16d is formed in a shape, which can be formed by deforming a part of the arc face of the circumferential wall inwardly into the flat shape. An engaging aperture 16e extending from the cylinder hole opening side to the cylinder hole bottom side of the large diameter tubular portion 16a is formed in each of the flat portions 16d. Each of the engaging protrusions 14d of the thrust transmitting plate 14b engages with a respective one of these three engaging apertures 16e such that it is movable only in the axis direction. Support pieces 16f for the cam spring 15 protrude radially inwardly at the cylinder opening side end portion of the small diameter tubular portion 16b.

Three locking parts 16g, each of which engages with a respective one of the engaging grooves 8e of the cylinder hole 8 and fits into the circumferential groove 8f, protrude from the cylinder hole bottom side of the large diameter tubular portion 16a at regular intervals in the circumferential direction. Bent pieces 16h, which extend from the cylinder hole bottom side and engage with the locking grooves 12c of the fixed side cam plate 12, are formed in portions of the circumferential wall between the neighboring locking parts 16g of the large diameter tubular portion 16a. Gap portions are formed between the neighboring bent pieces 16h on the cylinder hole bottom side of the locking parts 16g, and these gap portions constitute continuous holes 16i for communicating between the inside and the outside of the housing 16 when the disk brake apparatus is assembled.

The locking parts 16g are formed by protruding the circumferential wall of the large diameter tubular portion 16a into convex shapes to the outer circumference by piercing process, which is carried out simultaneously with the presswork for the housing 16. Each of the locking parts 16g is formed such that its size in the housing axis direction is larger than the plate thickness of the housing 16. Furthermore, each of the locking parts 16g is formed with such sizes in the housing circumference direction and in the height of the protrusion that it can be inserted in a respective one of the engaging grooves 8e of the cylinder hole 8 and firmly fit into the circumferential groove 8f.

The thus-formed disk brake apparatus 1 in accordance with this embodiment is assembled by inserting the cam spring 15 through the opening on the cylinder hole bottom side of the housing 16 until one end of the cam spring 15 contacts the support pieces 16f, and inserting the adjuster nut 14 in the internal circumference of the cam spring 15. The cylinder hole opening side end portion of the thrust transmitting plate 14b provided in the adjuster nut 14 comes into contact with the other end of the cam spring 15, and the engaging protrusions 14d of the adjuster nut 14 are engaged in the engaging apertures 16e of the housing 16 so that the thrust transmitting plate 14b is movable in the cylinder axis direction but is prevented from rotating in the circumferential direction. At this point, the engaging protrusions 14d are smoothly inserted within the large diameter tubular portion 16a of the housing 16, and protrude radially outwardly from the engaging apertures 16e of the small diameter tubular portion 16b. However, since the engaging apertures 16e are formed in the flat portions 16d, larger overlap widths for fitting the engaging protrusions 14d and the engaging apertures 16e can be secured even if the engaging protrusions 14d are formed in similar sizes to those of the conventional engaging protrusions.

Next, the cylindrical portion 21b of the drive side cam plate 21a, which is inserted through the spacer 25 and the thrust bearing 24 in advance, is accommodated in the accommodation hole 14c of the thrust transmitting plate 14b, and the cylinder hole bottom side of the thrust transmitting plate 14b comes into contact with the cylinder hole opening end portion of the drive side cam plate 21a through the spacer 25 and the thrust bearing 24. Next, the camshaft 21 is inserted through the insertion through hole 12a such that each of the cam bearings 23 is accommodated in a respective one of the ramp grooves 22. Then, after the engaging ribs 12b are aligned with their respective locking parts 16g in the cylinder axis direction, the bent pieces 16h of the housing 16 are bent so as to latch to the bottom of the fixed side cam plate 12.

In this manner, the fixed side cam plate 12 is arranged on the cylinder hole bottom side of the housing 16, and the thrust conversion mechanism 10, the thrust transmitting plate 14b, and the cam spring 15 are assembled within the housing 16 as a single unit. Furthermore, each of the engaging ribs 12b and the corresponding one of the locking parts 16g is arranged on the same cylinder axis direction line.

The unit, which is assembled in this manner, is aligned with the cylinder hole 8 such that the engaging ribs 12b and the locking parts 16g engage with their respective engaging grooves 8e formed in the small diameter portion 8b of the cylinder hole 8, and inserted in the cylinder hole 8 toward the cylinder hole bottom wall 8h. Then, the housing 16 is rotated in the state where the locking parts 16g are inserted so as to be aligned with the circumferential groove 8f, so that the locking parts 16g of the housing 16 engage in the circumferential groove 8f and the bent pieces 16h engage with the locking grooves 12c of the fixed side cam plate 12, and the camshaft 21 protruding from the fixed side cam plate 12 protrudes externally from the insertion through hole of the cylinder hole bottom wall 8h. The engagements of the end surfaces 16k of the locking parts 16g with the cylinder hole bottom wall 8i of the circumferential groove 8f can firmly prevent the housing 16 from coming off from the cylinder hole. The engagements of the engaging ribs 12b and the locking parts 16g with their respective engaging grooves 8e of the cylinder hole 8 can prevent the turning motion of the fixed side cam plate 12 and the housing 16. The continuous holes 16i of the housing 16 are arranged so as to align with the engaging grooves 8e communicating with the bleeder hole 8g, so that the internal space of the housing 16 communicates with the bleeder hole 8g through the continuous holes 16i and the engaging grooves 8e.

Meanwhile, the adjuster bolt 13, the ball bearings 20, the bearing plate 18, the spring member 17, and the retaining ring 19 are mounted one after another within the piston 9, and constitute a single unit. Next, while the adjuster bolt 13 is threadably engaged in the adjuster nut 14, the piston 9 is pushed into the cylinder hole 8 and a control lever 26 is attached to the protruding end of the camshaft 21. In this manner, the hydraulic actuating mechanism 3, the mechanical actuating mechanism 4, and the adjuster 11 are assembled in the caliper body 2. Each of the sealing materials is furnished in appropriate manufacturing stages.

In the disk brake apparatus 1 that is assembled in such a manner, since the engaging protrusions 14d formed on the outer circumference of the thrust transmitting plate 14b engages in the engaging apertures 16e, which are arranged in the flat portions 16d formed in the circumferential wall of the housing 16, sufficient overlap widths for fitting the engaging apertures 16e and the engaging protrusions 14d can be secured without the need to significantly protrude the engaging protrusions 14d from the circumferential wall of the housing 16 or to increase the plate thickness of the housing 16, and the reliable prevention of the rotation of the thrust transmitting plate 14b can be achieved with a simple structure.

Since the three locking parts 16g formed in the large diameter tubular portion 16a can have sufficient sizes both in the housing axis direction and the circumferential direction and sufficient protrusion sizes in the radially outward direction from the housing, the housing 16 can be firmly mounted to the circumferential groove 8f of the cylinder hole 8.

In the disk brake apparatus 1, in the brake operation using the hydraulic actuating mechanism 3, the piston 9 is pushed toward the disk rotor by the pressure of the hydraulic fluid, which is fed into the cylinder hole 8 in advance. Then, the friction pad 7 on the action portion 2a side is pressed on one side of the disk rotor 5, and its reactive force moves the caliper body 2 in the direction toward the action portion 2a and presses the friction pad 7 located on the reaction portion 2b side on the other side of the disk rotor 5 through the reaction portion 2b. As a result, the brake action is performed in the disk brake apparatus 1.

At this point, if the brake gaps between the friction pads 7 and the disk rotor 5 are within a specified range, the piston 9 moves only the length corresponding to the backlash of the adjuster bolt 13 and the adjuster nut 14, and therefore no adjustment action is initiated. When the brake gaps between the friction pads 7 and the disk rotor 5 exceed the specified value due to the wear of the friction pads 7, the piston 9 moves significantly toward the disk rotor 5 beyond the length corresponding to the backlash. As a result, the adjuster bolt 13 rotates and moves forward, and the clutch plate 13b contacts the conical surface 9c of the piston 9. When the brake is released in this state, the piston 9 and the adjuster bolt 13 move back the length corresponding to the backlash, and thereby the brake gaps between the friction pads 7 and disk rotor 5 are automatically adjusted within the specified range.

Furthermore, in the case of the parking brake operation by the mechanical actuating mechanism 4, when the control lever 26 is rotated by a handle lever or a foot pedal, the drive side cam plate 21a is turned with the camshaft 21. Then, since the phase of each of the ramp grooves 22 of the drive side cam plate 21a becomes different from that of the corresponding one of the ramp grooves 22 of the non-rotatable, fixed side cam plate 12, each of the cam bearings 23 moves toward the shallow portion of the corresponding ramp grooves 22, and thereby the drive side cam plate 21a moves apart from the fixed side cam plate 12 toward the disk rotor side. This movement of the drive side cam plate 21a in the axis direction is transferred to the piston 9 through the adjuster nut 14 and the adjuster bolt 13, and generates the thrust of the piston 9 toward the disk rotor side. Therefore, the brake action is performed in a similar manner to the above-mentioned brake action by the hydraulic actuating mechanism 3.

Since the reliable prevention of the rotation of the thrust transmitting plate 14b can be achieved with a simple structure in the above-described disk brake apparatus, the parking brake operation by the mechanical actuating mechanism 4 can be carried out consistently stably and reliably.

The present invention is not limited to the structure in which the thrust transmitting plate is formed in the adjuster nut, and the adjuster nut is accommodated in the housing. In other words, the thrust transmitting plate may be formed in the adjuster bolt, and the adjuster bolt may be accommodated in the housing.

Furthermore, the present invention is not limited to the structure in which the cylinder hole comprises three engaging grooves extending in the cylinder axis direction and the circumferential groove connecting middle portions of these engaging grooves, and the locking parts of the housing is latched to the circumferential groove as explained with the above-mentioned embodiment. Instead, an engaging groove in the circumferential direction may be formed in the cylinder hole, and a C-shaped ring may be attached on the cylinder hole opening side of the locking parts of the housing. Then, the locking parts may be latched to the engaging groove of the cylinder hole through the C-shaped ring.

What is claimed is:

1. A disk brake apparatus, comprising:
a piston accommodated in the distal end opening side of a cylinder hole;
a thrust conversion mechanism arranged on the bottom side of the cylinder hole; and
an adjuster having an adjuster nut and an adjuster bolt, the adjuster being provided between the thrust conversion mechanism and the piston;
wherein the piston is pushed by the thrust conversion mechanism through the adjuster;
wherein the thrust conversion mechanism comprises:
a fixed side cam plate attached on the bottom wall of the cylinder hole;
a camshaft passing through the cylinder hole bottom wall and the fixed side cam plate, the camshaft being rotatable with respect to the cylinder hole bottom wall and the fixed side cam plate and movable in the cylinder axis direction;
a drive side cam plate provided at the cylinder hole opening side end portion of the camshaft;
ramp grooves formed in the drive side cam plate and the fixed side cam plate, each of the ramp grooves in the drive side cam plate and a corresponding one of the ramp grooves in the fixed side cam plate being arranged in positions facing each other; and
cam bearings accommodated in the ramp grooves,
wherein the adjuster comprises a thrust transmitting plate at the cylinder hole bottom side end portion, which faces the drive side cam plate;
wherein the thrust transmitting plate, the drive side cam plate, and a cam spring for biasing the thrust transmitting plate toward the drive side cam plate are accommodated in a generally cylindrical housing, the housing being mounted in the cylinder hole;

wherein engaging protrusions are formed on the outer circumference of the thrust transmitting plate; and wherein parts of the arc face of the circumferential wall of the housing are deformed inwardly to form flat portions, and engaging apertures are formed on a portion of the flat portions, the engaging apertures being configured such that the engaging protrusions are movable only in the cylinder axis direction when the engaging apertures and the engaging protrusions are engaged.

2. The disk brake apparatus according to claim 1, wherein portions of the circumferential wall of the housing protrude outwardly in convex shapes by presswork to form plural locking parts arranged in the circumferential direction; and wherein the housing is mounted in the cylinder hole by latching said plural locking parts to a housing mounting portion formed in the cylinder hole.

3. The disk brake apparatus according to claim 2, wherein the thrust transmitting plate is formed in the adjuster nut, and wherein the adjuster nut is accommodated in the housing.

4. The disk brake apparatus according to claim 2, wherein the thrust transmitting plate is formed in the adjuster bolt, and wherein the adjuster bolt is accommodated in the housing.

5. The disk brake apparatus according to claim 1, wherein the thrust transmitting plate is formed in the adjuster nut, and wherein the adjuster nut is accommodated in the housing.

6. The disk brake apparatus according to claim 1, wherein the thrust transmitting plate is formed in the adjuster bolt, and wherein the adjuster bolt is accommodated in the housing.

* * * * *